(12) United States Patent
MacInnis (10) Patent No.: US 9,356,981 B2
(45) Date of Patent: May 31, 2016

(54) STREAMING CONTENT OVER A NETWORK (71) Applicant: Broadcom Corporation, Irvine, CA (US)

(72) Inventor: Alexander G. MacInnis, Lost Altos, CA (US)

(73) Assignee: BROADCOM CORPORATION, Irvine, CA (US)

( * ) Notice: Subject to any disclaimer, the term of this patent is extended or adjusted under 35 U.S.C. 154(b) by 384 days.

(21) Appl. No.: 13/723,756

(22) Filed: Dec. 21, 2012

(65) Prior Publication Data

US 2014/0149539 A1   May 29, 2014

Related U.S. Application Data

(60) Provisional application No. 61/731,048, filed on Nov. 29, 2012.

(51) Int. Cl.
*G06F 15/16* (2006.01)
*H04L 29/06* (2006.01)

(52) U.S. Cl.
CPC .......... *H04L 65/4084* (2013.01); *H04L 65/602* (2013.01); *H04L 65/607* (2013.01); *H04L 29/06482* (2013.01); *H04L 29/06489* (2013.01); *H04L 65/601* (2013.01)

(58) Field of Classification Search
CPC .............. H04L 29/06448; H04L 29/06476; H04L 29/06482; H04L 29/06489; H04L 65/4069; H04L 65/60; H04L 65/601; H04L 65/602; H04L 65/607

USPC .......... 709/203, 217, 219, 231, 232, 233, 236, 709/246, 247
See application file for complete search history.

(56) References Cited

U.S. PATENT DOCUMENTS

| | | | |
|---|---|---|---|
| 5,936,659 A * | 8/1999 | Viswanathan et al. ........ 725/103 |
| 6,502,139 B1 * | 12/2002 | Birk et al. ..................... 709/233 |
| 8,825,894 B2 * | 9/2014 | Zuckerman et al. ........... 709/235 |
| 2002/0029282 A1 * | 3/2002 | Buddhikot et al. ........... 709/231 |
| 2003/0043850 A1 * | 3/2003 | Kobayashi .................... 370/474 |
| 2004/0196852 A1 * | 10/2004 | Aksu et al. ................ 370/395.21 |
| 2007/0115963 A1 * | 5/2007 | Vadlakonda et al. ......... 370/389 |
| 2009/0217331 A1 * | 8/2009 | Park et al. ...................... 725/103 |
| 2010/0131996 A1 * | 5/2010 | Gauld ........................... 725/100 |
| 2011/0208872 A1 * | 8/2011 | Liddell et al. ................. 709/231 |
| 2013/0007200 A1 * | 1/2013 | van der Schaar et al. ..... 709/217 |
| 2013/0007223 A1 * | 1/2013 | Luby et al. .................... 709/219 |
| 2013/0083848 A1 * | 4/2013 | Joch et al. ................ 375/240.12 |
| 2013/0204973 A1 * | 8/2013 | Yie et al. ....................... 709/217 |
| 2014/0143440 A1 * | 5/2014 | Ramamurthy et al. ....... 709/231 |

* cited by examiner

*Primary Examiner* — Liangche A Wang
*Assistant Examiner* — Johnny Aguiar
(74) *Attorney, Agent, or Firm* — Foley & Lardner LLP (57) ABSTRACT

Disclosed are embodiments for streaming content over a network. First content segments are generated such that the time durations of at least a subset of the first content segments progressively increase with respect to time. Second content segments are generated that are configured to be played subsequent to the first content segments. The second content segments have time durations that are substantially the same with respect to each other. The first content segments and the second content segments are transmitted to a client device.

18 Claims, 5 Drawing Sheets

STREAMING CONTENT OVER A NETWORK

CROSS REFERENCE TO RELATED APPLICATIONS

This application claims priority to U.S. Provisional Patent Application 61/731,048, titled "STREAMING CONTENT OVER A NETWORK," filed on Nov. 29, 2012, which is incorporated by reference herein in its entirety.

BACKGROUND

Server computing devices may stream content, such as audio, video, and/or other types of content, to one or more client computing devices. For instance, a server computing device may stream live or recorded video. Upon receiving the content, the client computing devices may play the content.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
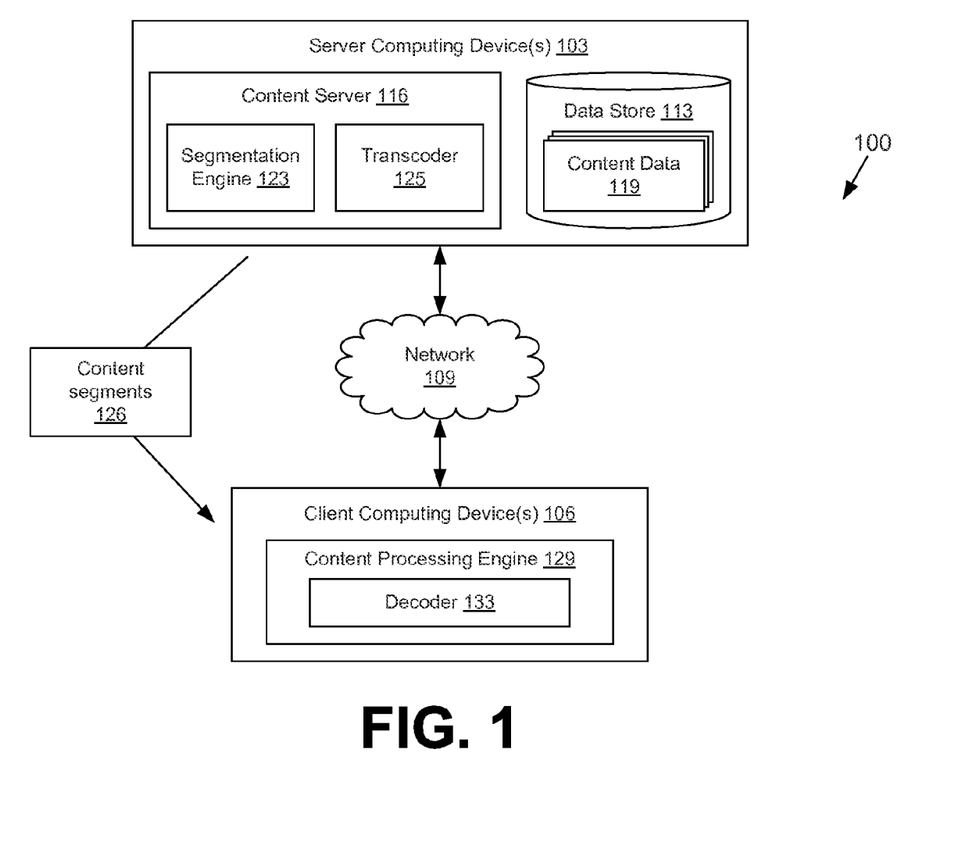
FIG. 1 is a drawing of an example of a networked environment according to various embodiments of the present disclosure.

The present disclosure is directed towards the streaming of content, such as video, audio, and/or other types of data, over a network. With reference to FIG. 1, shown is a networked environment 100 according to various embodiments of the present disclosure. The networked environment 100 includes a server computing device 103, a client computing device 106, and possibly other devices in data communication via a network 109. The network 109 includes, for example, the Internet, intranets, extranets, wide area networks (WANs), local area networks (LANs), wired networks, wireless networks, other suitable networks, or any combination thereof.

The server computing device 103 may comprise, for example, a server computer or any other system providing computing capability. Alternatively, a plurality of server computing devices 103 may be employed that are arranged, for example, in one or more server banks or computer banks or other arrangements. For example, a plurality of server computing devices 103 together may comprise a cloud computing resource, a grid computing resource, and/or any other distributed computing arrangement. Such server computing devices 103 may be located in a single installation or may be distributed among many different geographical locations. For purposes of convenience, the server computing device 103 is referred to herein in the singular. Even though the server computing device 103 is referred to in the singular, it is understood that a plurality of server computing devices 103 may be employed in the various arrangements, such as those described above.

Various applications and/or functionality may be executed in the server computing device 103 according to various embodiments. Also, various data is stored in a data store 113 that is accessible to the server computing device 103. The data store 113 may be representative of a plurality of data stores 113, as can be appreciated. The data stored in the data store 113 may be associated with the operation of the various applications and/or functional entities described below.

For example, content data 119 and potentially other types of data may be stored in the data store 113. The content data 119 may be data representing video, audio, and/or other types of content. The content data 119 may be part of a data file or streamed data, for example. According to various embodiments, the content data 119 may be encoded or compressed according to a particular format, such as a Moving Picture Experts Group (MPEG) encoded data format or any other type of data format. According to various embodiments, the content data 119 may be provided to the server computing device 103 from other computing devices (not shown) via the network 109.

The components executed on the server computing device 103 include, for example, a content server 116 and potentially other applications, services, processes, systems, engines, or functionality not discussed in detail for brevity. The content server 116 is executed to transmit various types of data to one or more of the client computing devices 106. As such, according to various embodiments, the content server 116 may employ a protocol such as hypertext transfer protocol (HTTP), simple object access protocol (SOAP), and/or other protocols. Such a content server 116 may comprise a commercially available network page server such as, for example, Apache® HTTP Server, Microsoft® Internet Information Services (IIS), and/or other types of servers. In various embodiments, the content server 116 may employ a video/audio streaming protocol, such as Dynamic Adaptive Streaming over HTTP (DASH) (also known as MPEG-DASH), HTTP Live Streaming (HLS), and/or any other type of streaming protocol.

The content server 116 may also include a segmentation engine 123, a transcoder 125, and potentially other components. As will be discussed in more detail later, the segmentation engine 123 may generate segments 126 that correspond to respective portions of the content data 119. In this sense, when the segments 126 are combined, the combined segments 126 may represent the content data 119 or a portion of the content data 119.

The transcoder 125 may generate the content segments 126 so that each generated content segment 126 is capable of being played individually on the client computing device 106. For example, once at least a portion of the content data 119 has been decoded into pictures, the transcoder 125 may encode content segments 126 comprising any number of those pictures, regardless of where the random access points are located in the content data 119. To this end, the transcoder 125 may encode each content segment 126 to have at least one random access point (e.g., a random access picture, such as an I-frame or any other random access point that indicates a start point for a decoding process) in order to facilitate playback of each content segment 126 individually on the client computing device 106. The content segments 126 may be encoded to be in a format that is different from the format of the data in the content data 119.

Alternatively, the encoding format of the content segments 126 may be the same as the format of the content data 119, and the transcoder 125 may provide each content segment 126 with a random access point that facilitates playback of each content segment 126 individually on the client computing device 106. Additionally, the transcoder 125 may perform processing functions such as, generating content segments 126 that have a bit rate different than that of the content data 119, generating content segments 126 that have different picture sizes than that of the content data 119, generating content segments 126 that are associated with interlaced video or progressive video, or any other type of processing.

By the content server 116 having transcoding capabilities, the segmentation engine 123 may generate content segments 126 of various sizes with each content segment 126 being compatible with a streaming protocol, such as DASH, HLS, or any other type of protocol. In this sense, each content segment 126 may be capable of being played back on the client computing device 106 without reliance on another content segment 126. It is noted that in some embodiments, an encoder may be used to transform uncompressed data in the content data 119 to the encoded content segments 126.

According to various embodiments, the segmentation engine 123 and the transcoder may generate multiple versions of each content segment 126, wherein each version has a different bitrate or other type of characteristic. The client computing device 106 may select the particular version of each content segment 126 that is to be transmitted to the client computing device based at least in part on, for example, network 109 conditions or other considerations. Alternatively, the content server 116 may determine the particular versions of the content segments 126 to transmit to the client computing device.

The client computing device 106 is representative of a plurality of client computing devices 106 that may be coupled to the network 109. The client computing device 106 may comprise, for example, a processor-based system such as a computer system. Such a computer system may be embodied in the form of a set top box, a television, a desktop computer, a laptop computer, a personal digital assistant, a cellular telephone, a music player, a web pad, a tablet computer system, a game console, or other device with like capability.

The client computing device 106 may include a content processing engine 129 and other functionality or components not discussed in detail for brevity. The content processing engine 129 obtains content segments 126 via the network 109 and processes these content segments 126 for display or other types of playback. To this end, the content processing engine 129 may further include one or more decoders 133 and/or other functionality that facilitates playing the content segments 126 on the client computing device 106. The decoder 133 may decode the received content segments 126 into uncompressed data for playback on the client computing device 106.

Next, a general description of the operation of the various components of the networked environment 100 is provided. To begin, it is assumed that the server computing device 103 is prepared to stream content to the client computing device 106 over the network 109. The process of streaming content over the network 109 may be initiated by the client computing device 106. For instance, a user of the client computing device 106 may use a network browser or other type of application on the client computing device 106 to access the server computing device 103 and request the streaming of content.

Upon receiving the request from the client computing device 106, the segmentation engine 123 obtains the corresponding content data 119 stored in the data store 113 and generates the first content segment 126. The first content segment 126 may correspond to the initial portion of the content data 119. For example, for embodiments where the content data 119 comprises video data, the first content segment 126 may comprise the initial picture of the video data. Alternatively, the first content segment 126 may correspond to any other location within the content data 119, such as if a user jumps forward in the playback of the content or if a user jumps to a chapter location of the content data 119.

It may be the case that the content processing engine 129 in the client computing device 106 does not begin playing a content segment 126 until the entire content segment 126 or multiple content segments 126 are obtained by the content processing engine 129. As such, the segmentation engine 123 may determine that the first content segment 126 is to be a relatively short content segment 126. By the first content segment 126 being of a relatively short length in time, the latency from the time when the content stream was requested by the client computing device 106 to when the client computing device 106 obtains the content segment 126 via the network 109 may be relatively short.

With the length of the first content segment 126 being determined, the segmentation engine 123 and the transcoder 125 may generate the first content segment 126, with the content data 119 being applied as an input. Thus, the first content segment 126 may be generated and encoded in a format that is compatible with the content processing engine 129. Thereafter, the first content segment 126 is transmitted to the client computing device 106 via the network 109. As an alternative, the content segment 126 may begin being transmitted to the client computing device 106 while the content segment 126 is still being generated. Thus, according to various embodiments, the generating and transmission of a content segment 126 may be concurrent.

The segmentation engine 123 and the transcoder 125 may then generate subsequent content segments 126 in a fashion similar to as discussed above with respect to generating the first content segment 126. The length of the subsequent content segments 126 may be longer or may be approximately the same as the duration of the first content segment 126.

The content server 116 may generate the content segments 126 wherein the lengths of the content segments 126 are based at least in part on a predetermined pattern. For example, after the occurrence of a predefined event, the content server 116 may determine to generate subsequent content segments 126 that are longer than the previous content segments 126. Such a predefined event may be, for example, a particular number of content segments 126 being generated, the expiration of a predetermined amount of time, receipt of a notification from the client computing device 106, or any other type of event. Additionally, the predefined event may be the first content segment 126 having been generated. According to various embodiments, each subsequent content segment 126 may be progressively longer than the immediately previous content segment 126. For example, each subsequent content segment 126 may be a predetermined percentage longer than the immediately previous content segment 126. In alternative embodiments, a predetermined number of content segments 126 may be generated before the content server 116 determines to increase the length of the subsequent content segments 126. For instance, after every m content segments 126, where m is a predetermined number, the length of the subsequent content segments 126 may be increased.

Upon the occurrence of another predefined event, the content server 116 may determine to stop increasing the lengths of the content segments 126. Such a predefined event may be, for example, a predetermined number of content segments 126 being generated and/or transmitted, the expiration of a predetermined amount of time, receipt of a notification from the client computing device 106, the length of a content segment 126 reaching a target length, or any other type of event. Thereafter, the segmentation engine 123 and the transcoder 125 may continue to generate content segments 126 until the end of the content data 119 is reached or the stream is terminated by the client computing device 106, for example.

Upon the first content segment 126 being obtained by the client computing device 106, the content processing engine 129 may begin decoding and playing back the first content segment 126. Alternatively, the content processing engine 129 may wait to start decoding and playback of the content segment 126 until after multiple content segments 126 have been received by the client computing device 106. Because the first one or more content segments 126 are relatively short in duration, the playback of the first one or more content segments 126 may begin relatively quickly after the content stream was requested by the client computing device 106. The client computing device 106 may continue to receive the subsequent content segments 126 from the server computing device 103, which are then decoded by the decoder 133 and played on the client computing device 106.

Figure 2A:
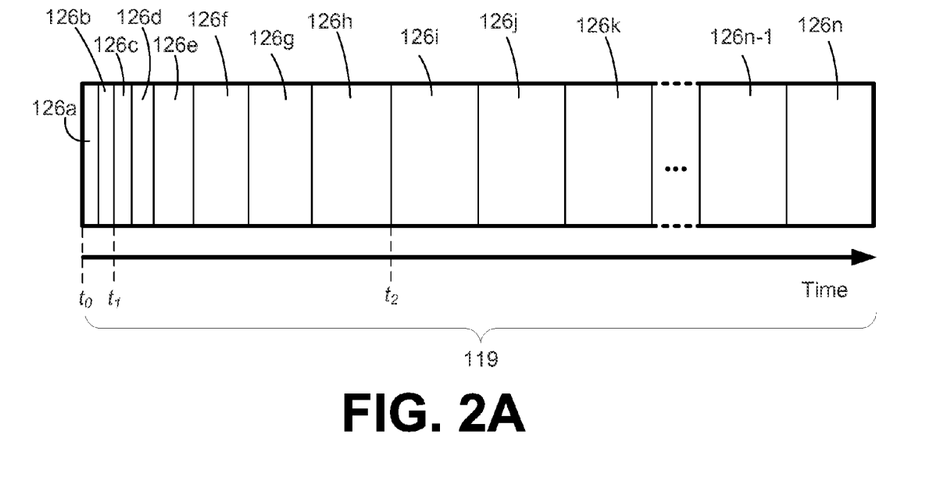
FIGS. 2A-2B are drawings illustrating examples of content segments in the networked environment of FIG. 1 according to various embodiments of the present disclosure.

Referring next to FIG. 2A, shown is a drawing illustrating an example of the content segments 126 according to various embodiments of the present disclosure. In particular, shown are the content segments 126, referred to herein as the content segments 126a-126n, overlaying their corresponding content data 119.

Beginning at time $t_0$, the first content segment 126a is generated. In the present example, the first content segment 126a and the second content segment 126b have the same lengths and have the shortest time durations with respect to the other content segments 126c-126n. Because the content segments 126a-126b are relatively short, these content segments 126a-126b may arrive at the client computing device 106 (FIG. 1) relatively quickly. Thus, the latency from the time when the content stream is requested by the client computing device 106 to the time when the content segment 126a begins playing on the client computing device 106 may be relatively short.

At time $t_1$, the content server 116 (FIG. 1) has determined to start increasing the length of the content segments 126c-126h. The content server 116 may determine to start increasing the lengths of the content segments 126c-126h in response to, for example, a predetermined number of content segments 126a-126b having been generated and/or transmitted, the expiration of a predetermined amount of time, receiving a notification from the client computing device 106, or any other type of event. In the present embodiment, each of the successive content segments 126c-126h has a duration that is greater than the duration of its immediately previous content segment 126b-126g. In alternative embodiments, the content server 116 may determine to increase the length of every $m^{th}$ content segment 126, for example. By gradually increasing the lengths of the content segments 126c-126h, encoding and/or transmission efficiencies may be improved, and the content segments 126 may be received and played by the client computing device 106 without interruption of the playback.

At time $t_2$, the content server 116 has determined to stop increasing the lengths of the content segments 126n-1-126n. As such, the duration of the content segments 126h to 126n-1 from time $t_2$ onward are substantially the same. The particular lengths of these content segments 126h to 126n-1 may be predetermined, or the content server 116 and the content processing engine 129 may agree upon a particular length. Additionally, the lengths of the content segments 126 may be adjusted for various reasons. For example, lengths may be adjusted to correspond to the locations of particular types of pictures in the content data 119. It is noted that the final content segment 126n may or may not have the same length as the content segment 126n-1.

Figure 2B:
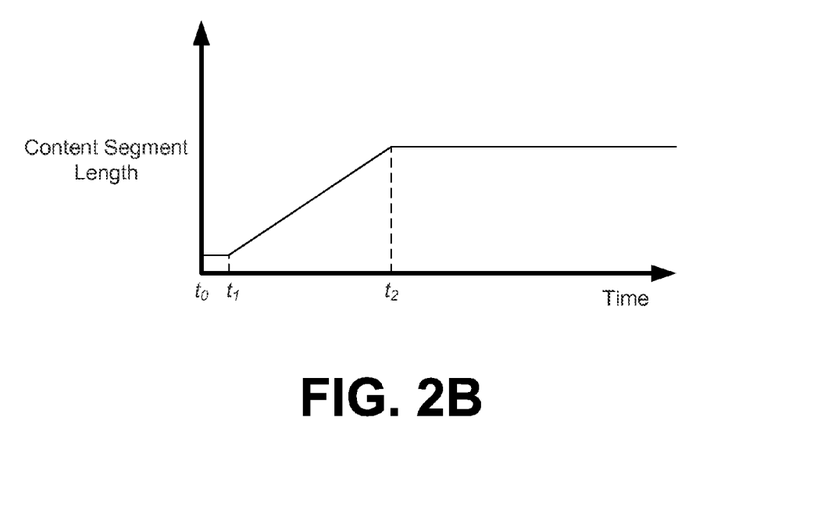

Turning now to FIG. 2B, shown is another drawing illustrating an example of the content segments 126 according to various embodiments of the present disclosure. At time $t_0$, the first one or more content segments 126 have a relatively short duration. At time $t_1$, the content server 116 has determined to start increasing the lengths of the subsequent content segments 126. It is understood that although FIG. 2B shows the lengths increasing linearly from time $t_0$ to time $t_1$, various alternative embodiments may have non-linearly increasing lengths of content segments 126 during this time period. As a non-limiting example, the lengths of the content segments 126 during this time period may increase exponentially. As an additional non-limiting example, the lengths of the content segments 126 may increase in a step-wise manner. Thus, the lengths of the content segments 126 may be determined according to a predetermined scheme.

At time $t_2$, the content server 116 has determined to stop increasing the lengths of the subsequent content segments 126. This time $t_2$, may correspond to the occurrence of a predetermined event, such as a predetermined number of content segments 126 being generated and/or transmitted, a time expiration, a notification from the client computing device 106 being received, or any other type of event.

Figure 3:
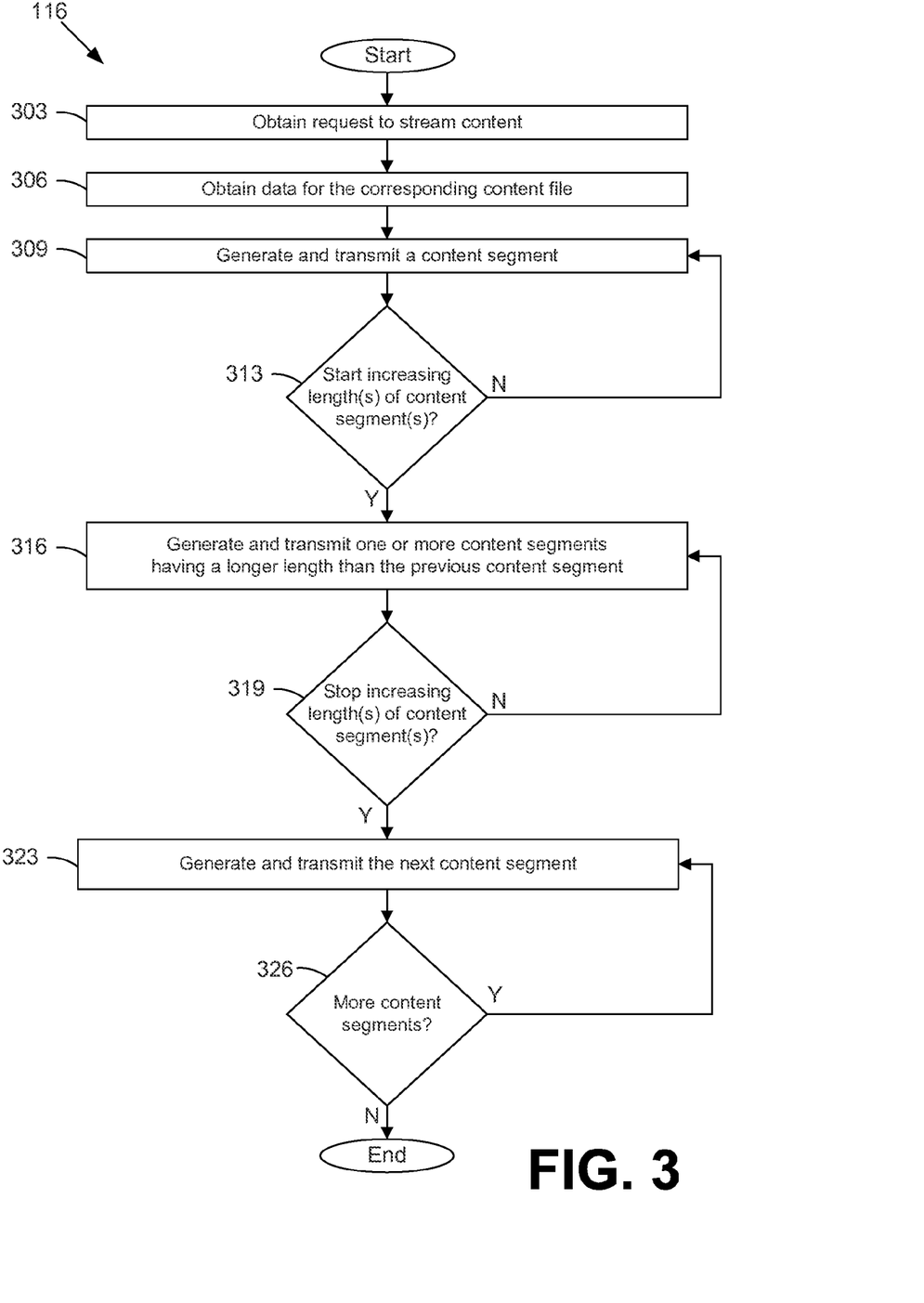
FIG. 3 is a flowchart illustrating an example of functionality implemented as portions of a content server executed in a server computing device in the networked environment of FIG. 1 according to various embodiments of the present disclosure.

Referring next to FIG. 3, shown is a flowchart that provides an example of the operation of a portion of the content server 116 according to various embodiments of the present disclosure. In particular, the flowchart of FIG. 3 shows an example of the content segments 126 (FIG. 1) being generated and transmitted to the client computing device 106 (FIG. 1). It is understood that the flowchart of FIG. 3 provides merely an example of the many different types of functional arrangements that may be employed to implement the operation of the portion of the content server 116 as described herein. As an alternative, the flowchart of FIG. 3 may be viewed as depicting an example of steps of a method implemented in the server computing device 103 (FIG. 1) according to one or more embodiments.

Beginning with reference number 303, the content server 116 obtains a request from the client computing device 106 to stream content, such as audio, video, and/or other types of content, to the client computing device 106. The content server 116 then obtains the data for the content data 119 (FIG. 1) that corresponds to the requested content, as shown by reference number 306. As indicated by reference number 309, a content segment 126 (FIG. 1) is generated and transmitted to the client computing device 106 (FIG. 1). The length of the first content segment 126 may be relatively short and may be predetermined or may be based at least in part on, for example, a predetermined value. In some embodiments, the length of the first content segment 126 may be based at least in part on the desired latency from the time of the content request to the time of playback on the client computing device 106, the coding efficiency of the content segment 126, the speed at which the content server 116 can generate a content segment 126 of a particular size, any other consideration, or any combination thereof.

The content server 116 then moves to reference number 313 where it determines whether it is to start increasing the length of one or more of the subsequent content segments 126. The content server 116 may start increasing the length of subsequent content segments 126 in response to, for example, a predetermined number of content segments 126 being previously generated and/or transmitted, after the expiration of a predetermined amount of time, after receiving a notification from the client computing device 106, or any other type of event. If the content server 116 is to not start increasing the length of one or more content segments 126, it returns to the reference number 309, and the process is repeated as shown.

If the content server 116 is to start increasing the length of one or more content segments 126, the content server 116 proceeds to reference number 316, where is generates and transmits a content segment having a longer length than the previous content segment 126, as shown by reference number 316. The length of the content segment 126 may be, for example, a predetermined percentage longer than the length of the previous content segment 126. As indicated by reference number 319, the content server 116 then determines whether it is to stop increasing the lengths of one or more of the subsequent content segments 126. The content server 116 may determine to stop increasing the lengths, for example, upon a predetermined number of content segments 126 being previously generated and/or transmitted, upon the expiration of a predetermined amount of time, upon receiving a notification from the client computing device 106, or after any other type of event.

If the content server 116 decides to continue increasing the length of one or more content segments 126, the content server 116 returns to reference number 316, and the process is repeated as shown. In some embodiments, each content segment 126 is lengthened, for example, by a predetermined percentage of the length of the previous content segment 126. In other embodiments, the lengthening is, for example, stepwise, wherein the lengthening occurs after every m content segments 126, where m is a predetermined number.

Once the content server 116 determines to stop increasing the lengths of the subsequent content segments 126, it generates and transmits the subsequent content segment 126, as indicated by reference number 323. The length of the subsequent content segment 126 may be, for example, the same length as the previous content segment 126, a length that is agreed upon between the content server 116 and the client computing device 106, or any other length. As shown by reference number 326, the content server 116 continues to generate and transmit the content segments 126, until there are no more content segments 126 to generate and transmit. Thereafter, the process ends.

Figure 4:
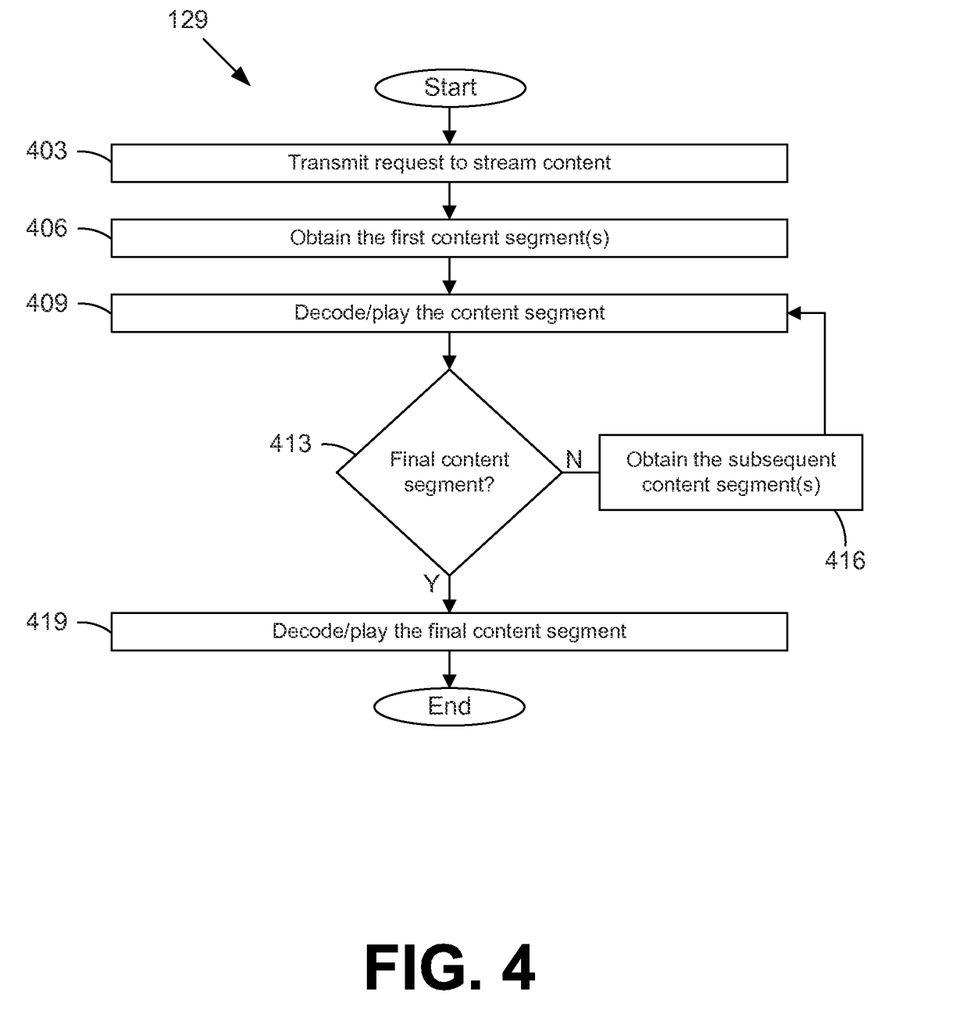
FIG. 4 is a flowchart illustrating an example of functionality implemented as portions of a content processing engine executed in the client computing device of FIG. 1 according to various embodiments of the present disclosure.

Referring next to FIG. 4, shown is a flowchart that provides an example of the operation of a portion of the content processing engine 129 according to various embodiments of the present disclosure. In particular, the flowchart of FIG. 4 shows an example of the content segments 126 (FIG. 1) being obtained and processed by the content processing engine 129. It is understood that the flowchart of FIG. 4 provides merely an example of the many different types of functional arrangements that may be employed to implement the operation of the portion of the content processing engine 129 as described herein. As an alternative, the flowchart of FIG. 4 may be viewed as depicting an example of steps of a method implemented in the client computing device 106 (FIG. 1) according to one or more embodiments.

Beginning with reference number 403, the content processing engine 129 transmits a request to the server computing device 103 (FIG. 1) to stream content, such as audio, video, and/or any other type of content, to the client computing device 106. Thereafter, the content processing engine 129 receives one or more first content segments 126 (FIG. 1) from the content server 116 (FIG. 1), as shown by reference number 406. In some embodiments, the content server 116 may generate multiple versions of each content segment 126, where each version has a different bitrate or other characteristic, and the content processing engine 129 may select the particular version of the content segment 126 to receive.

As indicated by reference number 409, the content processing engine 129 then begins decoding and/or playing the first one or more content segments 126. The content processing engine 129 then determines whether the obtained content segment 126 was the final content segment 126, as indicated by reference number 413. If not, the content processing engine 129 moves to reference number 416 and obtains one or more subsequent content segments 126. The subsequent content segments 126 may or may not be longer in length than the previous content segments 126, as discussed above.

After the final content segment 126 has been obtained, the content processing engine 129 moves to reference number 419, and the final content segment 126 is decoded and/or played on the client computing device 106. Thereafter, the process ends.

Figure 5:
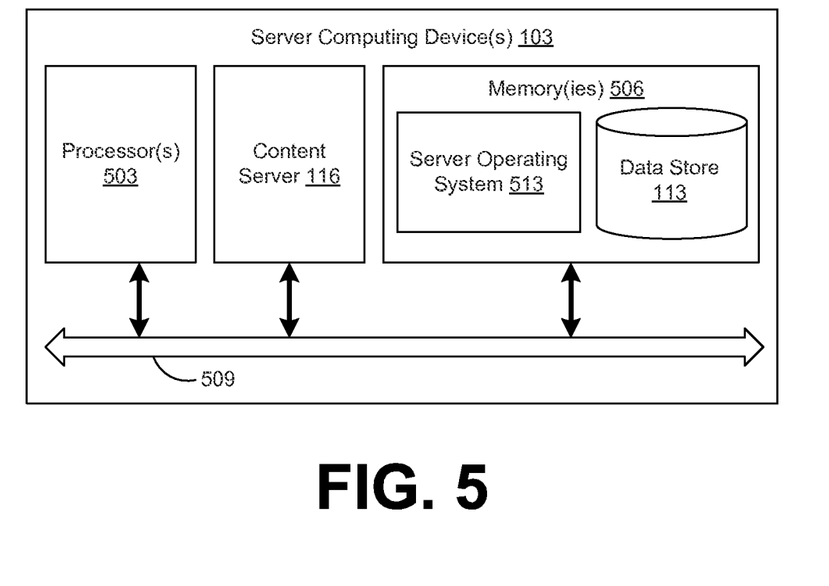
FIG. 5 is a schematic block diagram that provides an example illustration of a server computing device employed in the networking environment of FIG. 1 according to various embodiments of the present disclosure.

With reference to FIG. 5, shown is a schematic block diagram of the server computing device 103 according to various embodiments of the present disclosure. The server computing device 103 includes at least one processor 503, the content server 116, and at least one memory 506 coupled to a local interface 509. Potentially other components may be coupled to the local interface 509. The server computing device 103 may comprise a server computer or other type of device. The local interface 509 may comprise, for example, a data bus with an accompanying address/control bus or any other type of bus architecture. Stored in the memory 506 may be data and components that are executable by the processor 503 and/or the content server 116. For instance, the data store 113 and a server operating system 513 may be stored in the memory 506.

Figure 6:
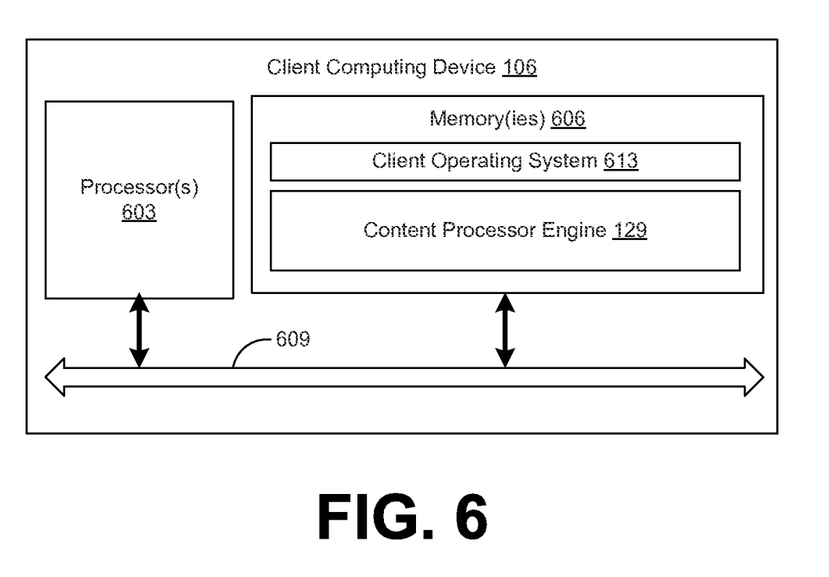
FIG. 6 is a schematic block diagram that provides an example illustration of a client computing device employed in the networked environment of FIG. 1 according to various embodiments of the present disclosure.

With reference to FIG. 6, shown is a schematic block diagram of the client computing device 106 according to various embodiments of the present disclosure. The client computing device 106 includes at least one processor 603 and at least one memory 606 coupled to a local interface 609. Potentially other components may be coupled to the local interface 609. The client computing device 106 may comprise, for example, a set top box, a personal computer, a mobile device (e.g., a smartphone), a television, or like device. The local interface 609 may comprise, for example, a data bus with an accompanying address/control bus or other bus architecture. Stored in the memory 606 may be data and components that are executable by the processor 603. For instance, the memory 606 may store a client operating system 613. If embodied as software, the content processor engine 129 may be stored in the memory 606. In alternative embodiments, the content processor engine 129 may be embodied in the form of hardware as a portion of the processor 603 or as a component that is separate from the processor 603.

Reference is now made to FIGS. 5-6. The processor 503, the content server 116, the content processor engine 129, and other components may be implemented by circuitry. In this regard, such circuitry may be arranged to perform the various functionality described above by generating and/or responding to electrical or other types of signals. The circuitry may be general purpose hardware or hardware that is dedicated to performing particular functions. The circuitry may include, but is not limited to, discrete components, integrated circuits, or any combination of discrete components and integrated circuits. Such integrated circuits may include, but are not limited to, one or more microprocessors, system-on-chips, application specific integrated circuits, digital signal processors, microcomputers, central processing units, programmable logic devices, state machines, other types of devices, and/or any other type of. Additionally, the circuitry may be configured to execute software to implement the functionality described herein.

The memories 506 and 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The flowcharts of FIGS. 3-4 show the functionality and operation of an implementation of portions of the segmentation engine 123 and the content processing engine 129, respectively. If embodied in hardware, each block may represent a circuit or a number of interconnected circuits to implement the specified logical function(s). If embodied in software, each reference number may represent a module, segment, or portion of code that comprises program instructions to implement the specified logical function(s).

Although the flowcharts of FIGS. 3-4 show a specific order of execution, it is understood that the order of execution may differ from that which is depicted. For example, the order of execution of two or more blocks may be scrambled relative to the order shown. Also, two or more blocks shown in succession in the flowcharts may be executed concurrently or with partial concurrence. Further, in some embodiments, one or more of the blocks shown in the flowcharts may be skipped or omitted. In addition, any number of counters, state variables, warning semaphores, or messages might be added to the logical flow described herein, for purposes of enhanced utility, accounting, performance measurement, or providing troubleshooting aids, etc.

Also, any logic or application described herein, including the segmentation engine 123, the content processing engine 129, and the content processor engine 129 can be embodied in any computer-readable medium, such as a non-transitory medium or a propagation medium, for use by or in connection with a system described herein. In this sense, the logic may comprise, for example, statements including instructions and declarations that can be fetched from the computer-readable medium and executed by the instruction execution system. In the context of the present disclosure, a "computer-readable medium" can be any medium that can propagate, contain, store, or maintain the logic, functionality, and/or application described herein.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure.

Therefore, at least the following is claimed:

1. An apparatus, comprising:
circuitry configured to:
receive, from a client device, a request to stream content to the client device; and
in response to the request, transmit the content to the client device as a plurality of content segments by:
generating and transmitting to the client device at least one first content segment having a first time duration;
generating and transmitting to the client device a plurality of second content segments configured to be played after the at least one first content segment and having a plurality of different time durations, wherein the different time durations of all of the plurality of second content segments progressively increase with respect to time, wherein each of the plurality of different time durations are at least as long as the first time duration, and wherein, for each of the plurality of second content segments, the respective second content segment is transmitted after the respective second content segment is generated to allow playback of the respective second content segment on the client device while content appearing after the respective second content segment is generated; and
generating and transmitting to the client device a plurality of third content segments configured to be played after the plurality of second content segments, the plurality of third content segments having a plurality of equal time durations, wherein, for each of the plurality of third content segments, the respective third content segment is transmitted after the respective third content segment is generated to allow playback of the respective third content segment on the client device while content appearing after the respective third content segment is generated; the circuitry configured to stop generating the plurality of second content segments having the different time durations and begin generating the plurality of third content segments having the equal time durations in response to at least one of:
generation of a predetermined number of the plurality of second content segments;
expiration of a predetermined amount of time; or
receipt of a notification from the client device.

2. The apparatus of claim 1, wherein the circuitry is further configured to encode the plurality of second content segments such that each of the plurality of second content segments comprises a random access point.

3. The apparatus of claim 1, wherein the plurality of third content segments are associated with a content file, and wherein the time durations of the plurality of third content segments are based at least in part on a plurality of random access point locations in the content file.

4. The apparatus of claim 1, wherein the circuitry is further configured to generate the plurality of third content segments in response to an occurrence of a predefined event.

5. The apparatus of claim 1, wherein the circuitry is further configured to generate a plurality of versions of each one of the plurality of second content segments, each one of the plurality of versions being associated with a different characteristic.

6. The apparatus of claim 1, wherein the at least one first content segment comprises a plurality of first content segments configured to be played prior to the plurality of second content segments, each of the plurality of first content segments having a time duration that is shorter than the different time durations of the plurality of second content segments.

7. The apparatus of claim 1, wherein the circuitry is configured to execute software to generate and transmit the at least one first content segment, the plurality of second content segments, and the plurality of third content segments.

8. A method, comprising:
receiving, by at least one computing device from a client device, a request to stream content to the client device;
in response to the request, streaming, by the at least one computing device, the content to the client device as a plurality of content segments, streaming the content comprising:
generating and transmitting to the client device at least one first content segment having a first time duration;
generating and transmitting to the client device a plurality of second content segments configured to be played after the at least one first content segment and having a plurality of different time durations, wherein the different time durations of all of the plurality of second content segments progressively increase with respect to time, wherein each of the plurality of different time durations are at least as long as the first time duration, and wherein, for each of the plurality of second content segments, the respective second content segment is transmitted after the respective second content segment is generated to allow playback of the respective second content segment on the client device while content appearing after the respective second content segment is generated; and
generating and transmitting to the client device a plurality of third content segments configured to be played after the plurality of second content segments, the plurality of third content segments having a plurality of equal time durations, wherein, for each of the plurality of third content segments, the respective third content segment is transmitted after the respective third content segment is generated to allow playback of the respective third content segment on the client device while content appearing after the respective third content segment is generated;
wherein generating the plurality of third content segments comprises stopping generating the plurality of second content segments having the different time durations and beginning generating the plurality of third content segments having the equal time durations in response to at least one of:

generation of a predetermined number of the plurality of second content segments;
expiration of a predetermined amount of time; or
receipt of a notification from the client device.

9. The method of claim 8, wherein generating the plurality of second content segments further comprises encoding each of the plurality of second content segments such that each of the plurality of second content segments comprises a random access point.

10. The method of claim 8, wherein the different time durations are based at least in part on a predefined pattern.

11. The method of claim 8, wherein the at least one first content segment comprises a plurality of first content segments configured to be played prior to the plurality of second content segments, the plurality of first content segments having a plurality of first time durations that are shorter than the different time durations for the plurality of second content segments.

12. The method of claim 11, wherein the plurality of third content segments are associated with a content file, and wherein the time durations of the plurality of third content segments are based at least in part on a plurality of random access point locations in the content file.

13. The method of claim 8, further comprising generating a plurality of versions of each one of the plurality of second content segments, each one of the plurality of versions being associated with a different characteristic.

14. The method of claim 13, wherein the different characteristic is a different bitrate.

15. A system, comprising:
at least one server device comprising circuitry configured to:
receive, from a client device, a request to stream content to the client device; and
in response to the request, transmit the content to the client device as a plurality of content segments by:
generating and transmitting to the client device at least one first content segment having a first time duration;
generating and transmitting to the client device a plurality of second content segments configured to be played after the at least one first content segment and having a plurality of different time durations, wherein the different time durations of all of the plurality of second content segments progressively increase with respect to time, wherein each of the plurality of different time durations are at least as long as the first time duration, and wherein, for each of the plurality of second content segments, the respective second content segment is transmitted after the respective second content segment is generated to allow playback of the respective second content segment on the client device while content appearing after the respective second content segment is generated; and
generating and transmitting to the client device a plurality of third content segments configured to be played after the plurality of second content segments, the plurality of third content segments having a plurality of equal time durations, wherein, for each of the plurality of third content segments, the respective third content segment is transmitted after the respective third content segment is generated to allow playback of the respective third content segment on the client device while content appearing after the respective third content segment is generated;
the circuitry configured to stop generating the plurality of second content segments having the different time durations and begin generating the plurality of third content segments having the equal time durations in response to at least one of:

generation of a predetermined number of the plurality of second content segments;

expiration of a predetermined amount of time; or receipt of a notification from the client device.

16. The system of claim 15, wherein the circuitry is further configured to encode each of the plurality of second content segments such that each of the plurality of second content segments comprises at least one random access point.

17. The system of claim 15, wherein the circuitry is further configured to:

decode data received by the at least one server device to thereby generate decoded data; and encode the plurality of second content segments and the plurality of third content segments using the decoded data.

18. The system of claim 15, wherein the different time durations for the plurality of second content segments are based at least in part on a predefined pattern.

* * * * *